United States Patent
Takamura et al.

(10) Patent No.: US 8,509,568 B2
(45) Date of Patent: Aug. 13, 2013

(54) IMAGE PROCESSING APPARATUS AND IMAGE PROCESSING METHOD

(75) Inventors: Akihiro Takamura, Fuchu (JP); Tetsurou Kitashou, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/490,260

(22) Filed: Jun. 6, 2012

(65) Prior Publication Data

US 2012/0328214 A1   Dec. 27, 2012

(30) Foreign Application Priority Data

Jun. 21, 2011   (JP) ................................ 2011-137737

(51) Int. Cl.
*G06K 9/54* (2006.01)

(52) U.S. Cl.
USPC ........... 382/300; 382/298; 382/274; 382/275; 345/427; 345/660

(58) Field of Classification Search
USPC ................. 382/300, 274, 275, 298; 345/427, 345/660
See application file for complete search history.

(56) References Cited

U.S. PATENT DOCUMENTS

| | | | | |
|---|---|---|---|---|
| 6,546,157 | B1 * | 4/2003 | Okuno et al. | 382/300 |
| 2005/0157947 | A1 * | 7/2005 | Kim | 382/298 |
| 2005/0180655 | A1 * | 8/2005 | Ohta et al. | 382/275 |
| 2006/0050074 | A1 * | 3/2006 | Bassi | 345/427 |
| 2006/0204125 | A1 * | 9/2006 | Kempf et al. | 382/274 |
| 2007/0065043 | A1 | 3/2007 | Sano | 382/293 |
| 2009/0002398 | A1 * | 1/2009 | Goerzen | 345/660 |
| 2009/0296117 | A1 | 12/2009 | Wada et al. | |

FOREIGN PATENT DOCUMENTS

| | | |
|---|---|---|
| JP | 6-149993 | 5/1994 |
| JP | 2005-135096 | 5/2005 |

* cited by examiner

*Primary Examiner* — Stephen R Koziol
*Assistant Examiner* — Shaghayegh Azima
(74) *Attorney, Agent, or Firm* — Fitzpatrick, Cella, Harper & Scinto

(57) ABSTRACT

This apparatus obtains a mapped position (xo, yo) of (xi, yi), acquires (xi', yi') by performing inverse mapping for each reference position being based on (xo, yo), obtains (xi", yi") by performing inverse mapping for integer parts xoc and yoc of xo and yo respectively, and performs interpolation using fraction parts of x- and y-coordinates of a position, of (xi", yi") and (xi', yi'), whose integer parts of the x- and y-coordinates respectively coincide with xi and yi, and peripheral pixel values of (xi, yi).

5 Claims, 9 Drawing Sheets

IMAGE PROCESSING APPARATUS AND IMAGE PROCESSING METHOD

BACKGROUND OF THE INVENTION

1. Field of the Invention

The present invention relates to an image deformation technique.

2. Description of the Related Art

A conventional image processing apparatus which performs image deformation stores input pixels corresponding to one frame in a memory first, and then calculates the coordinate values of the input pixels from the coordinate values of output pixels in the scan order of the output pixels by inverse transformation of coordinate transformation. This apparatus further repeats the operation of reading out pixels adjacent to the input pixels from the memory by using the integer parts of the coordinate values of the input pixels obtained by the inverse transformation and deciding the values of output pixels by interpolation calculation using the adjacent pixels and the fraction parts of the coordinate values of input pixels. These operations have implemented image processing configured to perform image deformation. The above method will be referred to as "read time coordinate transformation" hereinafter. For example, patent literature 1 (Japanese Patent Laid-Open No. 2005-135096) discloses an image processing method which segments an output image into tiles and performs read time coordinate transformation for each segmented tile.

When performing keystone correction for a front projector or lens correction for a camera, the enlargement rate from an input image to an output image ranges from the minimum of about 0.6 to the maximum of about 1.25. In addition, there is a restriction that video input/output operation must be implemented in real time. When implementing the above image processing method under the restriction that video input/output operation should be performed at 1 [pixel/cyc], the peak value of a necessary memory band becomes a total of (1+1/minimum value of enlargement rate) [pixels/cyc] for both write and read operations. If, for example, the minimum value of enlargement rate is 0.6, a memory band of 2.67 [pixels/cyc] is required at a peak time.

In contrast to this, the following is a scheme called "write time coordinate transformation". This scheme calculates output coordinates by performing coordinate transformation of input pixels input in the scan order. The scheme then calculates storage destination addresses of the memory from the integer parts of the output coordinates. In addition, the scheme obtains coordinates in the input image from the integer parts of the output coordinates by inverse transformation of coordinate transformation. If the integer parts of the coordinates obtained by inverse transformation coincide with the coordinates of the original input pixels, the scheme obtains pixel values to be output by interpolation calculation using the input pixels, the adjacent pixels, and the fraction parts of the coordinate values obtained by inverse transformation of coordinate transformation. These pixel values are stored at the storage destination addresses obtained in advance.

The peak value of a necessary memory band in the write time coordinate transformation scheme becomes a total of (1+maximum value of enlargement rate) [pixels/cyc] for both write and read operations. When the maximum value of enlargement rate is 1.25, the peak value becomes 2.25 [pixels/cyc]. That is, the peak value of a memory band can be made smaller than that in read time coordinate transformation within the assumed range of enlargement rates.

However, with the above write time coordinate transformation without any change, some pixels may not be output. It is therefore necessary to take some countermeasures. For example, according to patent literature 2 (Japanese Patent Laid-Open No. 6-149993) which performs write time coordinate transformation, the generation of pixels which are not output is prevented by scanning the coordinates of input pixels for each sub-pixel.

In the scheme disclosed in patent literature 1, the peak value of a necessary memory band becomes large within the assumed range of enlargement rates. In the scheme disclosed in patent literature 2, even when scanning sub-pixels on a ½ pixel basis in both the X-axis direction and the Y-axis direction, it is necessary to perform computation corresponding to four points in coordinate transformation and computation corresponding to four points in inverse transformation. In projection transformation, the computation amount for coordinate transformation is equal to that for inverse transformation, and both the computations include division. For this reason, the hardware implementation of the scheme disclosed in patent literature 2 will result in a large circuit amount. The software implementation of the scheme will result in a deterioration in processing performance.

SUMMARY OF THE INVENTION

The present invention has been made in consideration of the above problems, and provides an image deformation technique in which the peak value of a necessary memory band is small and the circuit amount for hardware implementation is small or the processing performance at the time of software implementation is high.

According to one aspect of the present invention, there is provided an image processing apparatus which generates an output image by performing image deformation processing for an input image, comprising: a unit that obtains a pixel position $(x_o, y_o)$ at which a pixel position $(x_i, y_i)$ in the input image is mapped by performing the image deformation processing for the input image; an acquisition unit that acquires a plurality of reference pixel positions set in advance for a combination of whether or not a fraction part of a value obtained by adding 0.5 to a fraction part of $x_o$ is not less than a specified value and/or whether or not a fraction part of a value obtained by adding 0.5 to a fraction part of $y_o$ is not less than a specified value; a unit that obtains a pixel position $(x_i', y_i')$ by performing inverse mapping of the mapping for each of the plurality of reference pixel positions; a unit that obtains a pixel position $(x_i'', y_i'')$ by performing the inverse mapping for a pixel position $(x_{oc}, y_{oc})$ represented by an integer part $x_{oc}$ of the $x_o$ and an integer part $y_{oc}$ of the $y_o$; a specification unit that specifies a pixel position, of the pixel position $(x_i'', y_i'')$ and the pixel position $(x_i', y_i')$ obtained for each of the plurality of reference pixel positions, at which an integer part of an x-coordinate value and an integer part of a y-coordinate value respectively coincide with $x_i$ and $y_i$; and a calculation unit that obtains a pixel value at a pixel position $(x_{oc}, y_{oc})$ on the output image by performing interpolation processing using a fraction part of the x-coordinate value and a fraction part of the y-coordinate value at the pixel position specified by the specification unit and pixel values of pixels at peripheral pixel positions of the pixel position $(x_i, y_i)$ in the input image.

According to another aspect of the present invention, there is provided an image processing method performed by an image processing apparatus which generates an output image by performing image deformation processing for an input image, comprising: a step of obtaining a pixel position $(x_o,$ yo) at which a pixel position (xi, yi) in the input image is mapped by performing the image deformation processing for the input image; an acquisition step of acquiring a plurality of reference pixel positions set in advance for a combination of whether or not a fraction part of a value obtained by adding 0.5 to a fraction part of xo is not less than a specified value and/or whether or not a fraction part of a value obtained by adding 0.5 to a fraction part of yo is not less than a specified value; a step of obtaining a pixel position (xi', yi') by performing inverse mapping of the mapping for each of the plurality of reference pixel positions; a step of obtaining a pixel position (xi", yi") by performing the inverse mapping for a pixel position (xoc, yoc) represented by an integer part xoc of the xo and an integer part yoc of the yo; a specification step of specifying a pixel position, of the pixel position (xi", yi") and the pixel position (xi', yi') obtained for each of the plurality of reference pixel positions, at which an integer part of an x-coordinate value and an integer part of a y-coordinate value respectively coincide with xi and yi; and a calculation step of obtaining a pixel value at a pixel position (xoc, yoc) on the output image by performing interpolation processing using a fraction part of the x-coordinate value and a fraction part of the y-coordinate value at the pixel position specified in the specification step and pixel values of pixels at peripheral pixel positions of the pixel position (xi, yi) in the input image.

Further features of the present invention will become apparent from the following description of exemplary embodiments with reference to the attached drawings.

DESCRIPTION OF THE EMBODIMENTS

The embodiments of the present invention will be described below with reference to the accompanying drawings. Note that each embodiment described below is an example of the execution of the present invention, and is a specific embodiment of the arrangement described in the scope of the claims.

First Embodiment

This embodiment will exemplify an example of reducing the number of peripheral pixels requiring coordinate transformation (coordinate inverse transformation), including central coordinates, up to five points by segmenting an image into two regions by using the fraction parts of output coordinates after coordinate transformation and an example of reducing the number of peripheral pixels up to four points by segmenting an image into four regions. It is possible to arbitrarily segment an image into regions. The number of peripheral pixels necessary for inverse transformation (inverse mapping) changes depending on the region segmentation method to be used. It is possible to easily change what kind of regions into which an image is segmented.

This embodiment will exemplify a case in which projection transformation is performed as an example of image deformation processing. If, however, the processing to be performed includes coordinate transformation of pixel positions (coordinates) and its inverse transformation, the embodiment can also be applied to geometric transformation other than projection transformation.

Figure 1:
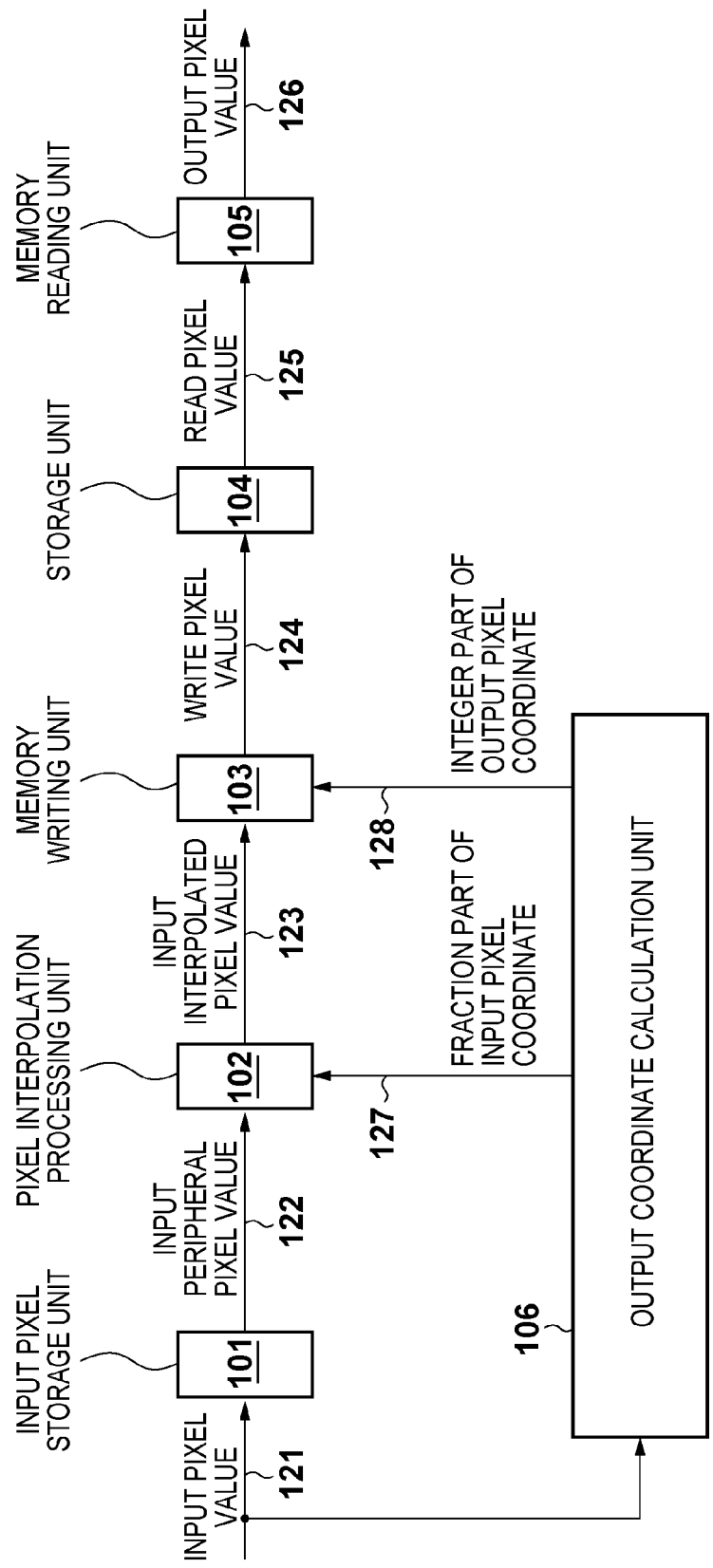
FIG. 1 is a block diagram showing an example of the functional arrangement of an image processing apparatus.

An example of the functional arrangement of an image processing apparatus according to this embodiment will be described with reference to the block diagram of FIG. 1. The image processing apparatus receives an image (input image) to be subjected to image deformation processing. Assume that in the embodiment, this input image is input on a pixel basis. However, the manner of inputting an input image to the image processing apparatus is not specifically limited.

The pixel value of an input pixel input to the image processing apparatus (or a pixel value read out from the memory in the image processing apparatus) is stored as an input pixel value 121 in an input pixel storage unit 101 and is also input to an output coordinate calculation unit 106.

A pixel interpolation processing unit 102 reads out, from the input pixel storage unit 101 as input peripheral pixel values 122, the pixel values of pixels necessary to obtain the pixel value of a pixel on an output image which corresponds to the input pixel (pixels at peripheral pixel positions around the input pixel). The pixel interpolation processing unit 102 further acquires a fraction part 127 of the pixel position (x- and y-coordinate values) of each pixel obtained by the output coordinate calculation unit 106 with respect to the input pixel from the output coordinate calculation unit 106. The pixel interpolation processing unit 102 then obtains the pixel value of the pixel on the output image which corresponds to the input pixel by performing interpolation processing by using the readout input peripheral pixel values 122 and the fraction parts 127 of the pixel positions of the acquired respective pixels.

Various kinds of interpolation techniques can be applied to interpolation processing. When, for example, bilinear interpolation is to be performed, bilinear interpolation is performed from 2×2 pixels including an input pixel, and the interpolated pixel is output. When bicubic interpolation is to be performed, bicubic interpolation is performed from 4×4 pixels including an input pixel, and the interpolated pixel is output.

The pixel interpolation processing unit 102 transmits the obtained pixel value as an input interpolated pixel value 123 to a memory writing unit 103.

The memory writing unit 103 receives "an integer part 128 of the pixel position of the pixel on the output image which corresponds to the input pixel" from the output coordinate calculation unit 106, and specifies an address in a storage unit 104 which corresponds to the pixel position represented by the received integer part 128. The memory writing unit 103 then stores an input interpolated pixel value 123 from the pixel interpolation processing unit 102 as a write pixel value 124 at the specified address.

The speed at which data are written at random addresses is low. When using, as the storage unit 104, a memory such as a DRAM in which data can be written at consecutive addresses at high speed, this apparatus buffers the input interpolated pixel value 123 in the memory writing unit 103. The apparatus then writes a plurality of input interpolated pixel values 123 in the storage unit 104 altogether.

A memory reading unit 105 sequentially reads out the pixel values of the respective pixels of the image having undergone projection transformation stored in the storage unit 104, and outputs them as output pixel values 126. Although the output order is not specifically limited, it is conceivable to use a scheme of outputting data in the raster order or performing main scanning in the vertical direction or a method of segmenting an image into tiles and reading out pixel values on a tile basis.

Figure 2:
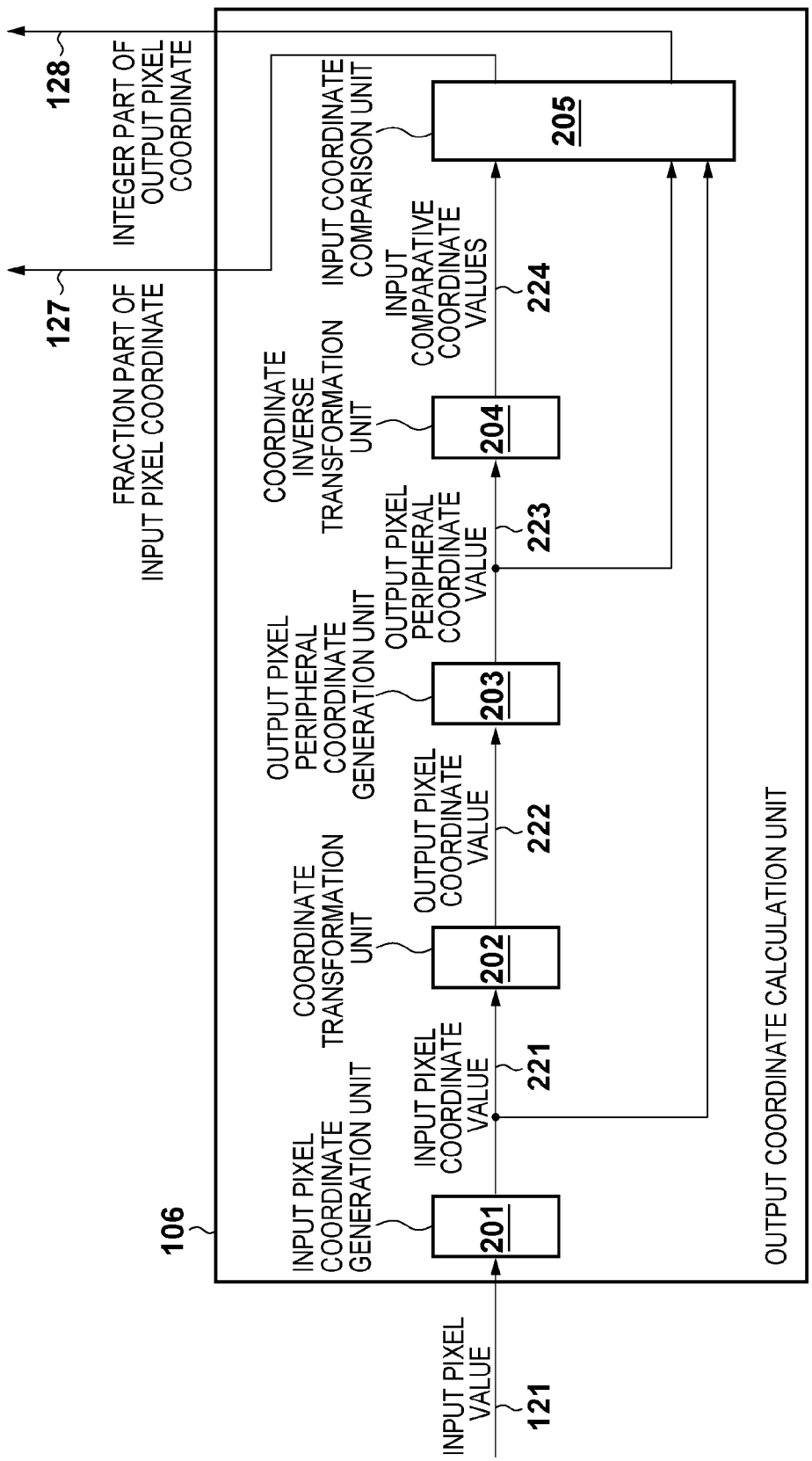
FIG. 2 is a block diagram showing an example of the functional arrangement of an output coordinate calculation unit 106 in more detail.

An example of the functional arrangement of the output coordinate calculation unit 106 will be described in more detail with reference to the block diagram of FIG. 2. Upon receiving the input pixel value 121, an input pixel coordinate generation unit 201 obtains the pixel position of the input pixel on the input image (in the input image). Assume that the input pixel value 121 includes VSYNC and HSYNC signals. In this case, upon receiving VSYNC, the input pixel coordinate generation unit 201 resets the Y-coordinate to 0. Upon receiving HSYNC, the input pixel coordinate generation unit 201 resets the X-coordinate to 0. When receiving a pixel value upon reception of the previous HSYNC signal, the input pixel coordinate generation unit 201 increments the Y-coordinate by one. Upon receiving a pixel value, the input pixel coordinate generation unit 201 increments the X-coordinate by one. Upon setting the X-coordinate and Y-coordinate counted in this manner, the input pixel coordinate generation unit 201 sends the resultant value as an input pixel coordinate value 221 to a coordinate transformation unit 202 and an input coordinate comparison unit 205. If the input pixel value 121 includes the pixel value of the input pixel, the input pixel coordinate generation unit 201 sends this pixel value as the input pixel coordinate value 221 without any change to the coordinate transformation unit 202 and the input coordinate comparison unit 205.

The coordinate transformation unit 202 performs projection transformation for the input pixel coordinate value 221 by using a matrix for projection transformation to obtain the coordinate value after projection transformation as an output pixel coordinate value 222. This matrix is represented by a 3×3 matrix including m11 to m33 as components. Performing projection transformation for the input pixel coordinate value 221 (xi, yi) by using this matrix will obtain the output pixel coordinate value 222 (xo, yo) as the pixel coordinate position to which the input pixel coordinate value 221 (xi, yi) is mapped.

At this time, when using an even-numbered order filter such as a bilinear filter with 2×2 pixels or a bicubic filter with 4×4 pixels, the central coordinates of the filter shift from the center of input pixel coordinates by (+0.5, +0.5). For this reason, coordinate transformation is performed with respect to (xi+0.5, yi+0.5). When using an odd-numbered order filter, since the central coordinates of the filter coincide with (xi, yi), coordinate transformation is performed with respect to (xi, yi). The following example is an expression for calculating the output pixel coordinate value 222 (xo, yo) when using an even-numbered order filter:

$$xo0 = m11 \cdot (xi+0.5) + m12 \cdot (yi+0.5) + m13$$

$$yo0 = m21 \cdot (xi+0.5) + m22 \cdot (yi+0.5) + m23$$

$$xo0 = m31 \cdot (xi+0.5) + m32 \cdot (yi+0.5) + m33$$

$$xo = xo0/zo0$$

$$yo = yo0/zo0$$

The coordinate transformation unit 202 sends the output pixel coordinate value 222 (xo, yo) obtained in this manner to an output pixel peripheral coordinate generation unit 203 on the subsequent stage.

The output pixel peripheral coordinate generation unit 203 acquires a plurality of reference pixel positions set in advance with respect to a combination of information indicating whether the fraction part of the value obtained by adding 0.5 to the fraction part of xo is equal to or more than a specified value and/or indicating whether the fraction part of the value obtained by adding 0.5 to the fraction part of yo is equal to or more than a specified value.

Figure 3:
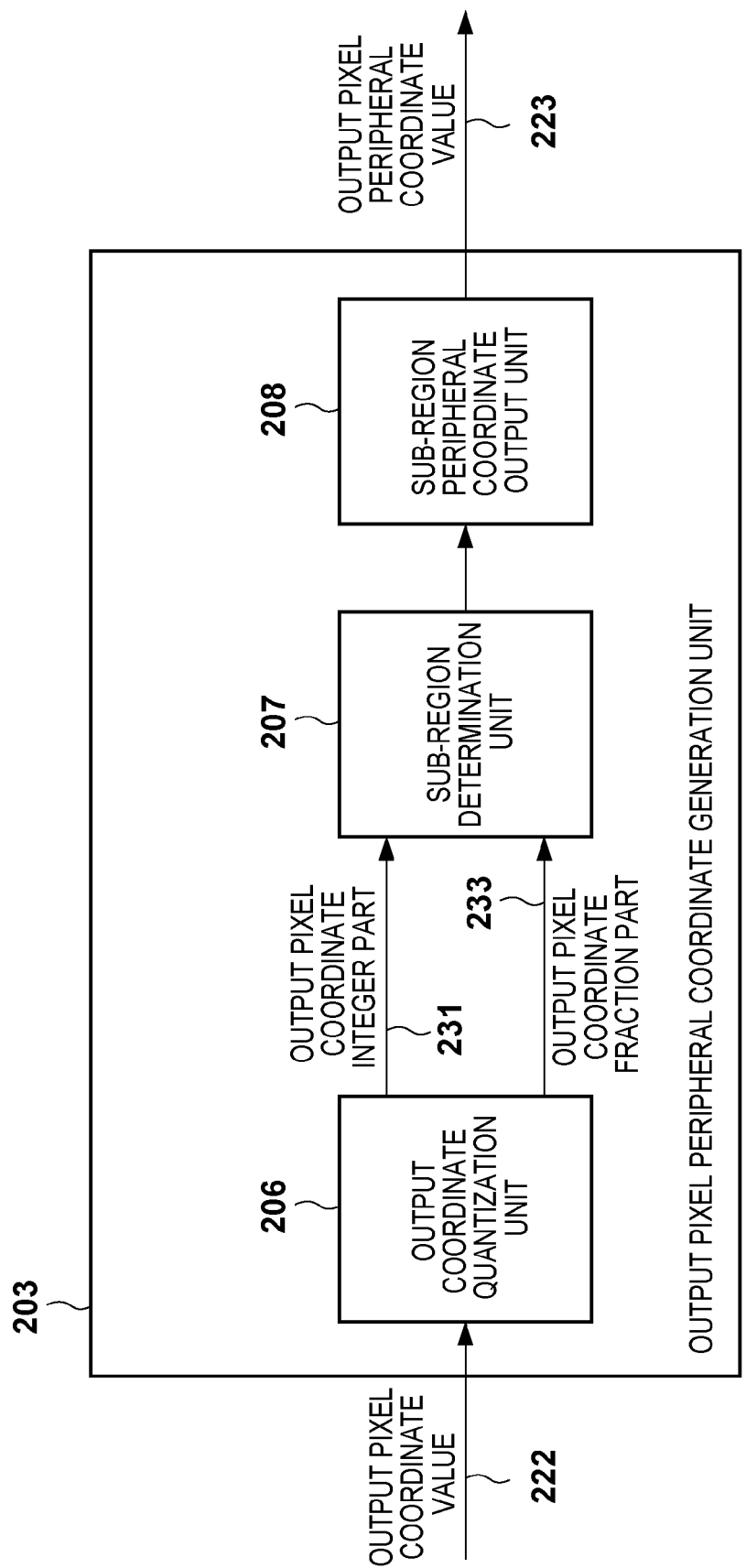
FIG. 3 is a block diagram showing an example of the functional arrangement of an output pixel peripheral coordinate generation unit 203 in more detail.

An example of the functional arrangement of the output pixel peripheral coordinate generation unit 203 will be described in more detail with reference to the block diagram of FIG. 3. An output coordinate quantization unit 206 calculates an integer part xoc of xo and an integer part yoc of yo by applying the following equations to the output pixel coordinate value 222 (xo, yo):

$$xoc = \text{floor}(xo+0.5)$$

$$yoc = \text{floor}(yo+0.5)$$

Note that the floor(x) function is a function for returning a maximum integer equal to or less than x. The output coordinate quantization unit 206 outputs a pixel position (xoc, yoc) as an output pixel coordinate integer part 231 to a sub-region determination unit 207 on the subsequent stage.

On the other hand, the output coordinate quantization unit 206 calculates a fraction part xof of xo and a fraction part yof of yo by applying the following equations to the output pixel coordinate value 222 (xo, yo). In this case, the output coordinate quantization unit 206 performs subsequent determination according to $0 \leq xof < 1$ and $0 \leq yof < 1$, and hence adds 0.5 to each of the values obtained by subtracting the fraction parts from xo and yo. Depending on the manner of performing determination, it is possible to change the equations for calculating xof and yof.

$$xof = xo - \text{floor}(xo+0.5) + 0.5$$

$$yof = yo - \text{floor}(yo+0.5) + 0.5$$

The output coordinate quantization unit 206 then outputs xof and yof obtained in this manner as output pixel coordinate fraction parts 233 to the sub-region determination unit 207 on the subsequent stage.

Figure 4:
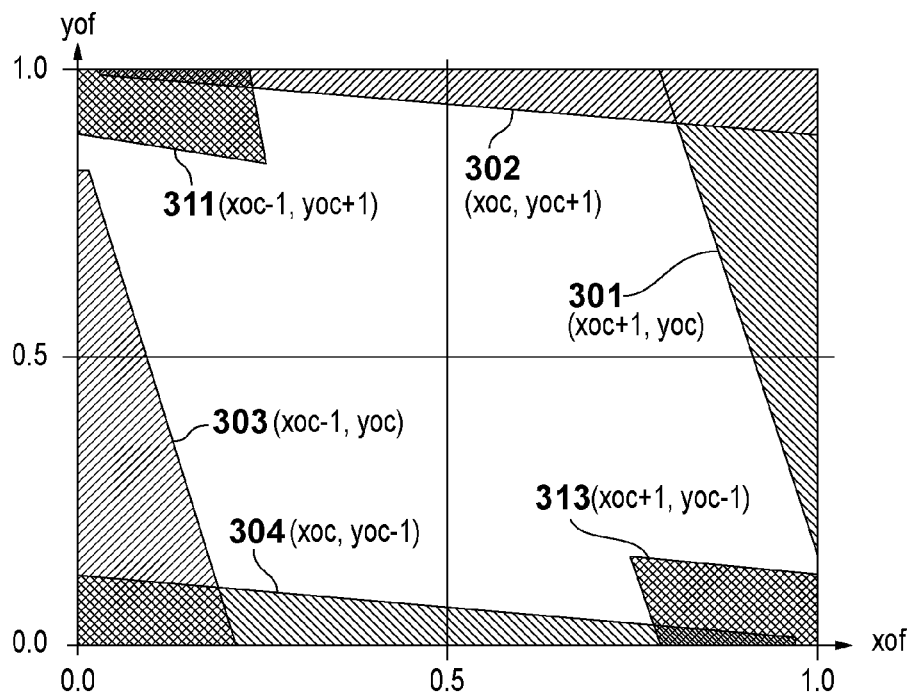
FIG. 4 is a graph for explaining the operation of a sub-region determination unit 207.

The sub-region determination unit 207 specifies a combination of information indicating whether xof is equal to or more than a specified value and/or indicating whether yof is equal to or more than a specified value. The operation of the sub-region determination unit 207 will be described with reference to FIG. 4. In the graph of FIG. 4, the abscissa axis represents xof; and ordinate axis, yof.

Referring to FIG. 4, a region 301 is a region satisfying the following condition. Assume that the pixel position obtained by performing inverse transformation of the above projection transformation for a pixel position (xoc+1, yoc) adjacent to the right of the pixel position (xoc, yoc) is represented by (p1, q1). In this case, the region 301 is the range of xof and yof, in which the integer part of p1 coincides with xi, and the integer part of q1 coincides with yi. On the other hand, when the position (xof, yof) represented by xof and yof obtained by the above equations is located in the region 301, the integer parts of p1 and q1 obtained by performing inverse transformation of the above projection transformation for the pixel position (xoc+1, yoc) respectively coincide with xi and yi.

The following are equations for obtaining (pi, qi) from (po, qo) by performing inverse transformation of the above projection transformation and equations for calculating integer parts (pic, qic) from (pi, qi) by using an even-numbered order filter when an interpolation coefficient k falls within the range of $0 \leq k < 1$. Note that when using an odd-numbered order filter upon setting an interpolation coefficient k so as to satisfy $-0.5 \leq k < 0.5$, the integer parts (pic, qic) are obtained by adding 0.5 to each of pi and qi:

$$pi0 = r11 \cdot po + r12 \cdot qo + r13$$

$$qi0 = r21 \cdot po + r22 \cdot qo + r23$$

$$ri0 = r31 \cdot po + r32 \cdot qo + r33$$

$$pi = pi0/ri0$$

$$qi = qi0/ri0$$

Note however that (r11-r33) is an inverse matrix of (m11-m33). When being limited to projection transformation, (r11-r33) may be a constant multiple of an inverse matrix of (m11-m33).

$$pic = \text{floor}(pi)$$

$$qic = \text{floor}(qi)$$

Likewise, assume that the pixel position obtained by performing inverse transformation of the above projection transformation for a pixel position (xoc, yoc+1) adjacent to the lower of the pixel position (xoc, yoc) is represented by (p2, q2). In this case, a region 302 is the range of xof and yof, in which the integer part of p2 coincides with xi, and the integer part of q2 coincides with yi. On the other hand, when the position (xof, yof) represented by xof and yof obtained by the above equations is located in the region 302, the integer parts of p2 and q2 obtained by performing inverse transformation of the above projection transformation for the pixel position (xoc, yoc+1) respectively coincide with xi and yi.

Likewise, assume that the pixel position obtained by performing inverse transformation of the above projection transformation for a pixel position (xoc−1, yoc+1) adjacent to the lower left of the pixel position (xoc, yoc) is represented by (p3, q3). In this case, a region 311 is the range of xof and yof, in which the integer part of p3 coincides with xi, and the integer part of q3 coincides with yi. On the other hand, when the position (xof, yof) represented by xof and yof obtained by the above equations is located in the region 311, the integer parts of p3 and q3 obtained by performing inverse transformation of the above projection transformation for the pixel position (xoc−1, yoc+1) respectively coincide with xi and yi.

Likewise, assume that the pixel position obtained by performing inverse transformation of the above projection transformation for a pixel position (xoc−1, yoc) adjacent to the left of the pixel position (xoc, yoc) is represented by (p4, q4). In this case, a region 303 is the range of xof and yof, in which the integer part of p4 coincides with xi, and the integer part of q4 coincides with yi. On the other hand, when the position (xof, yof) represented by xof and yof obtained by the above equations is located in the region 303, the integer parts of p4 and q4 obtained by performing inverse transformation of the above projection transformation for the pixel position (xoc−1, yoc) respectively coincide with xi and yi.

Likewise, assume that the pixel position obtained by performing inverse transformation of the above projection transformation for a pixel position (xoc, yoc−1) adjacent to the upper of the pixel position (xoc, yoc) is represented by (p5, q5). In this case, a region 304 is the range of xof and yof, in which the integer part of p5 coincides with xi, and the integer part of q5 coincides with yi. On the other hand, when the position (xof, yof) represented by xof and yof obtained by the above equations is located in the region 304, the integer parts of p5 and q5 obtained by performing inverse transformation of the above projection transformation for the pixel position (xoc, yoc−1) respectively coincide with xi and yi.

Likewise, assume that the pixel position obtained by performing inverse transformation of the above projection transformation for a pixel position (xoc+1, yoc−1) adjacent to the upper right of the pixel position (xoc, yoc) is represented by (p6, q6). In this case, a region 313 is the range of xof and yof, in which the integer part of p6 coincides with xi, and the integer part of q6 coincides with yi. On the other hand, when the position (xof, yof) represented by xof and yof obtained by the above equations is located in the region 313, the integer parts of p6 and q6 obtained by performing inverse transformation of the above projection transformation for the pixel position (xoc+1, yoc−1) respectively coincide with xi and yi.

Referring to FIG. 4, the pixel positions obtained by performing inverse transformation of the above projection transformation for the pixel positions (xoc−1, yoc−1) and (xoc+1, yoc+1) do not satisfy the condition that integer part of x-coordinate value=xi and integer part of y-coordinate=yi.

On the other hand, according to the case shown in FIG. 4, the sub-region determination unit 207 determines whether xof as the output pixel coordinate fraction part 233 belongs to the range (sub-region) of $0 \leq xof < 0.5$ or the range (sub-region) of $0.5 \leq xof < 1$. The sub-region determination unit 207 then notifies a sub-region peripheral coordinate output unit 208 on the subsequent stage of the determination result.

Upon receiving a notification that xof as the output pixel coordinate fraction part 233 belongs to the range (sub-region) of $0 \leq xof < 0.5$, the sub-region peripheral coordinate output unit 208 decides the pixel positions as reference pixel positions:

(xoc, yoc+1)
(xoc−1, yoc)
(xoc, yoc−1)
(xoc−1, yoc+1)

Upon receiving a notification that xof as the output pixel coordinate fraction part 233 belongs to the range (sub-region) of $0.5 \leq xof < 1.0$, the sub-region peripheral coordinate output unit 208 decides the pixel positions as reference pixel positions:

(xoc+1, yoc)
(xoc, yoc+1)
(xoc, yoc−1)
(xoc+1, yoc−1)

The sub-region peripheral coordinate output unit 208 then outputs the reference pixel positions decided in the above manner in accordance with the range to which xof belongs and the pixel position (xoc, yoc) as output pixel peripheral coordinate values 223.

A method of deciding reference pixel positions in accordance with the range to which xof belongs is not specifically limited, and various methods are conceivable. For example, it is possible to acquire reference pixel positions corresponding to xoc obtained above from a table in which reference pixel positions corresponding to each range to which xof belongs are registered.

A coordinate inverse transformation unit 204 obtains inversely transformed coordinate values corresponding to the respective pixel positions as the output pixel peripheral coordinate values 223 by performing inverse transformation of the above projection transformation for the respective pixel positions as the output pixel peripheral coordinate values 223. In this case, the pixel position obtained by performing inverse transformation of the above projection transformation for a reference pixel position decided in accordance with the range to which xof belongs is written as (xi', yi'). In addition, the pixel position obtained by performing (calculating) inverse transformation of the above projection transformation for the pixel position (xoc, yoc) is written as (xi", yi").

The coordinate inverse transformation unit 204 sends the inversely transformed coordinate values (xi', yi') and (xi", yi") obtained in this manner as input comparative coordinate values 224 to the input coordinate comparison unit 205 on the subsequent stage.

The input coordinate comparison unit 205 specifies a pixel position, of the pixel positions (xi", yi") and (xi', yi'), whose integer parts of the x- and y-coordinate values coincide with xi and yi, respectively. The input coordinate comparison unit 205 then sends the fraction parts of the x- and y-coordinate values of the specified pixel position as the fraction parts 127 to the pixel interpolation processing unit 102, and sends the pixel position (xoc, yoc) 128 to the memory writing unit 103. This allows the pixel interpolation processing unit 102 to obtain a pixel value at the pixel position (xoc, yoc) on the output image by performing the above interpolation processing. The memory writing unit 103 can also store the pixel value at the pixel position (xoc, yoc) at the address in the storage unit 104 which corresponds to the pixel position (xoc, yoc).

Modification

A modification of the operation of the sub-region determination unit 207 will be described with reference to FIG. 5. Referring to the graph of FIG. 5, the abscissa axis represents xof; and the ordinate axis, yof. The targets indicated by reference numerals in FIG. 5 are the same in basic items as those shown in FIG. 4 even though they differ in their shapes.

Figure 5:
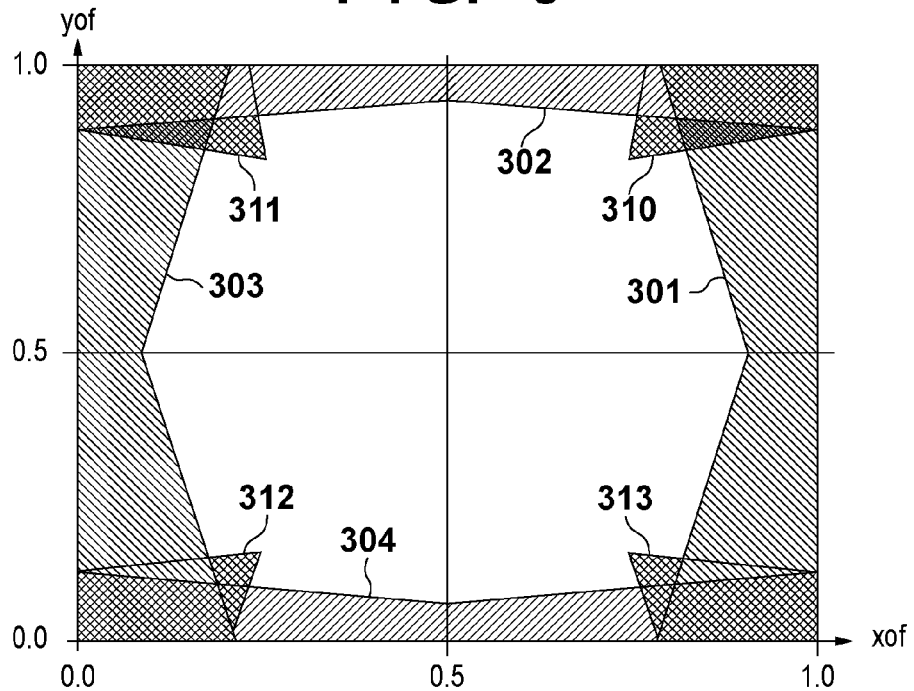
FIG. 5 is a graph for explaining a modification of the operation of the sub-region determination unit 207.

Referring to FIG. 5, a region 312 is a region satisfying the following condition. Assume first that the pixel position obtained by performing inverse transformation of the above projection transformation for the pixel position (xoc−1, yoc−1) adjacent to the upper left of the pixel position (xoc, yoc) is represented by (p7, q7). In this case, the region 312 is the range of xof and yof, in which the integer part of p7 coincides with xi, and the integer part of q7 coincides with yi. On the other hand, when the position (xof, yof) represented by xof and yof obtained by the above equations is located in the region 312, the integer parts of p7 and q7 obtained by performing inverse transformation of the above projection transformation for the pixel position (xoc−1, yoc−1) respectively coincide with xi and yi.

Likewise, assume that the pixel position obtained by performing inverse transformation of the above projection transformation for the pixel position (xoc+1, yoc+1) adjacent to the lower right of the pixel position (xoc, yoc) is represented by (p8, q8). In this case, the region 310 is the range of xof and yof, in which the integer part of p8 coincides with xi, and the integer part of q8 coincides with yi. On the other hand, when the position (xof, yof) represented by xof and yof obtained by the above equations is located in the region 310, the integer parts of p8 and q8 obtained by performing inverse transformation of the above projection transformation for the pixel position (xoc+1, yoc+1) respectively coincide with xi and yi.

In this modification, upon receiving a notification that xof and yof as the output pixel coordinate fraction parts 233 respectively belong to the range of $0.0 \leq xof < 0.5$ and the range of $0.0 \leq yof < 0.5$, the sub-region peripheral coordinate output unit 208 decides the pixel positions as reference pixel positions:

(xoc−1, yoc)
(xoc, yoc−1)
(xoc−1, yoc−1)

Upon receiving a notification that xof and yof as the output pixel coordinate fraction parts 233 respectively belong to the range of $0.5 \leq xof < 1.0$ and the range of $0.0 \leq yof < 0.5$, the sub-region peripheral coordinate output unit 208 decides the pixel positions as reference pixel positions:

(xoc+1, yoc)
(xoc, yoc−1)
(xoc+1, yoc−1)

Upon receiving a notification that xof and yof as the output pixel coordinate fraction parts 233 respectively belong to the range of $0.0 \leq xof < 0.5$ and the range of $0.5 \leq yof < 1.0$, the sub-region peripheral coordinate output unit 208 decides the pixel positions as reference pixel positions:

(xoc−1, yoc)
(xoc, yoc+1)
(xoc−1, yoc+1)

Upon receiving a notification that xof and yof as the output pixel coordinate fraction parts 233 respectively belong to the range of $0.5 \leq xof < 1.0$ and the range of $0.5 \leq yof < 1.0$, the sub-region peripheral coordinate output unit 208 decides the pixel positions as reference pixel positions:

(xoc, yoc+1)
(xoc+1, yoc)
(xoc+1, yoc+1)

As described above, there are various combinations of information indicating whether the fraction part of the value obtained by adding 0.5 to the fraction part of xo is equal to or more than a specified value and/or indicating whether the fraction part of the value obtained by adding 0.5 to the fraction part of yo is equal to or more than a specified value. The combinations to be used are not limited to those in the first embodiment and this modification. In any case, a plurality of preset reference pixel positions are associated with each of the combinations. Regardless of any of the combinations which is assumed to be used, it is possible to uniquely specify a corresponding reference pixel position group.

As described above, this embodiment including this modification can reduce the number of peripheral pixels requiring coordinate transformation (coordinate inverse transformation). Since it is possible to reduce the number of times of necessary coordinate transformation as compared with the prior art, it is possible to reduce the circuit amount to an amount smaller than that in the conventional write time coordinate transformation scheme.

In addition, it is possible to reduce the circuit amount at the time of hardware implementation while the peak value of a necessary memory band remains small or to perform projection transformation with high processing performance at the time of software implementation.

Second Embodiment

Figure 6:
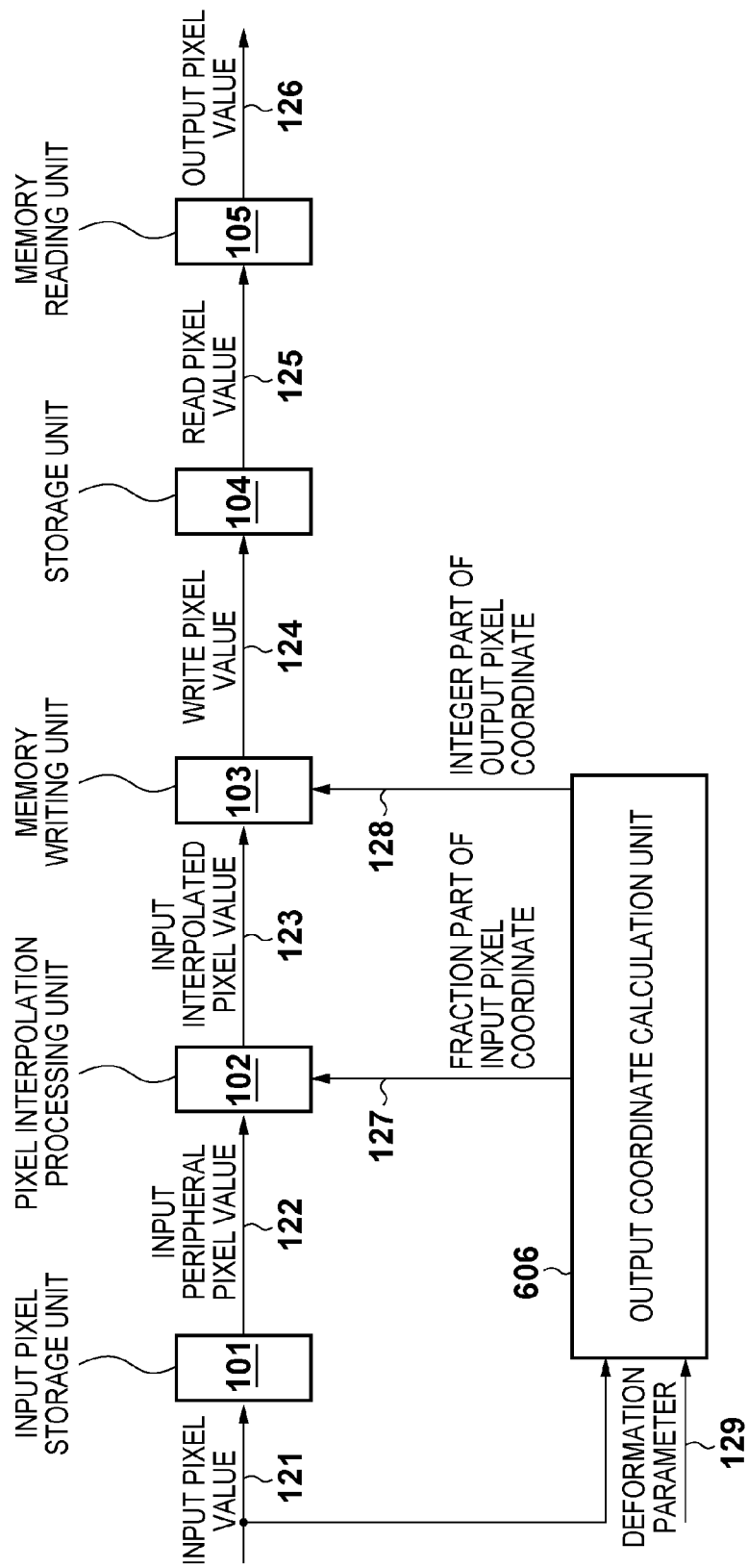
FIG. 6 is a block diagram showing an example of the functional arrangement of the image processing apparatus.

An example of the functional arrangement of an image processing apparatus according to the second embodiment will be described with reference to the block diagram of FIG. 6. The same reference numerals as in FIG. 1 denote the same constituent elements in FIG. 6, and a description of them will be omitted. The image processing apparatus according to this embodiment is obtained by replacing the output coordinate calculation unit 106 by an output coordinate calculation unit 606 in the arrangement shown in FIG. 1. The output coordinate calculation unit 606 receives a deformation parameter 129 as data of the above matrix. Since constituent elements other than the output coordinate calculation unit 606 are the same as those described in the first embodiment, the output coordinate calculation unit 606 will be described below.

In the following description, the data expressed as xo, yo, xoc, and yoc in the first embodiment will be expressed as xot, yot, xotC, and yotC. That is, they represent the same data except that they differ in variable names. For example, xo and xot represent the same data.

Figure 7:
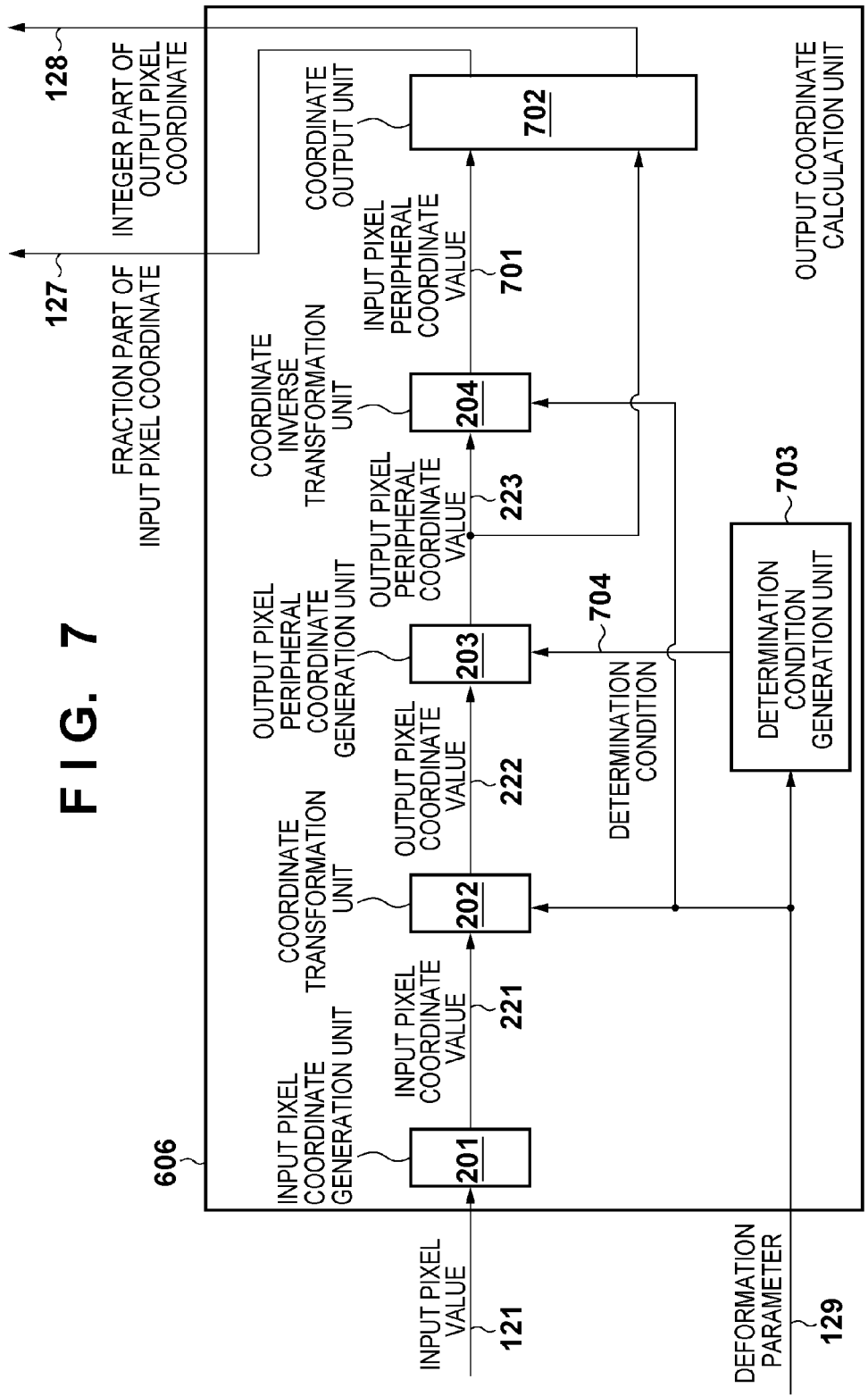
FIG. 7 is a block diagram showing an example of the functional arrangement of an output coordinate calculation unit 606.

An example of the arrangement of the output coordinate calculation unit 606 will be described with reference to the block diagram of FIG. 7. The same reference numerals as in FIG. 2 denote the same constituent elements in FIG. 7, and a description of them will be omitted.

Upon receiving the deformation parameter 129 as data of the matrix described in the first embodiment, a coordinate transformation unit 202 performs projection transformation for an input pixel coordinate value 221 in the same manner as in the first embodiment. The coordinate transformation unit 202 then sends the coordinate value obtained by this projection transformation as an output pixel coordinate value 222 to an output pixel peripheral coordinate generation unit 203 on the subsequent stage.

Upon receiving the deformation parameter 129, a determination condition generation unit 703 generates a condition for deciding a reference pixel position by using the deformation parameter 129. The determination condition generation unit 703 outputs the generated condition as a determination condition 704 to the output pixel peripheral coordinate generation unit 203. The operation of the determination condition generation unit 703 will be described in detail later.

Upon receiving the deformation parameter 129 as data of the matrix described in the first embodiment, a coordinate inverse transformation unit 204 performs inverse transformation of projection transformation for an output pixel peripheral coordinate values 223 by using the deformation parameters 129 in the same manner as in the first embodiment. The coordinate inverse transformation unit 204 then sends the inversely transformed coordinate value obtained by this inverse transformation as an input pixel peripheral coordinate value 701 to a coordinate output unit 702 on the subsequent stage.

The coordinate output unit 702 sends the fraction parts of the x- and y-coordinate values of the input pixel peripheral coordinate value 701 as fraction parts 127 to a pixel interpolation processing unit 102. In addition, the coordinate output unit 702 sends a pixel position (xotC, yotC) as an integer part 128 to a memory writing unit 103.

For example, when not performing image deformation, the output coordinate calculation unit 606 outputs one integer part 128 and one fraction part 127 for one input pixel value 121. More specifically, this corresponds to a case in which the deformation parameter 129 is a 3×3 matrix constituted by m11 to m33. In another case, when image deformation includes an enlarged portion, a plurality of integer parts 128 and a plurality of fraction parts 127 may be output for one input pixel value 121.

First of all, the output pixel peripheral coordinate generation unit 203 obtains a fraction part xotf of xo and a fraction part yotf of yo according to the following equations:

$xotf = xot - \text{floor}(xot + 0.5) + 0.5$ $yotf = yot - \text{floor}(yot + 0.5) + 0.5$ If xotf and yotf satisfy the determination condition 704, the output pixel peripheral coordinate generation unit 203 acquires a plurality of reference pixel positions corresponding to the determination condition 704. The output pixel peripheral coordinate generation unit 203 then outputs the acquired plurality of reference pixel positions and the pixel position (xotC, yotC) as the output pixel peripheral coordinate values 223. The following nine coordinate values are possible coordinate values that the output pixel peripheral coordinate generation unit 203 may output as the output pixel peripheral coordinate values 223:

(xotC−1, yotC−1)
(xotC+0, yotC−1)
(xotC+1, yotC−1)
(xotC−1, yotC+0)
(xotC+0, yotC+0)
(xotC+1, yotC+0)
(xotC−1, yotC+1)
(xotC+0, yotC+1)
(xotC+1, yotC+1)

Figure 8A:
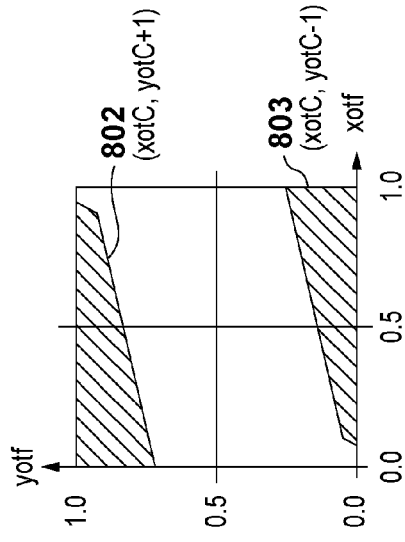
FIGS. 8A to 8D are graphs for explaining processing of obtaining a region.
Figure 8B:
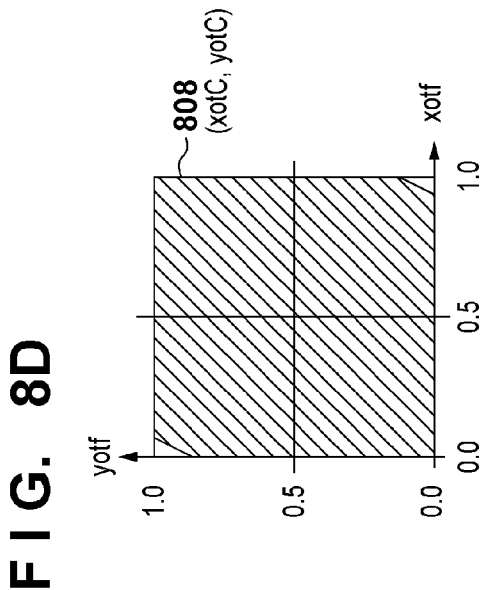
Figure 8C:
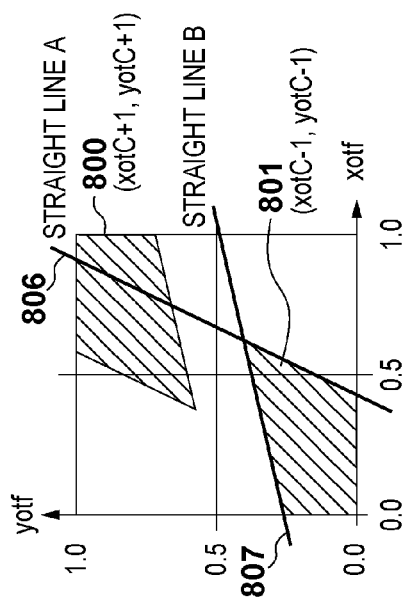
Figure 8D:
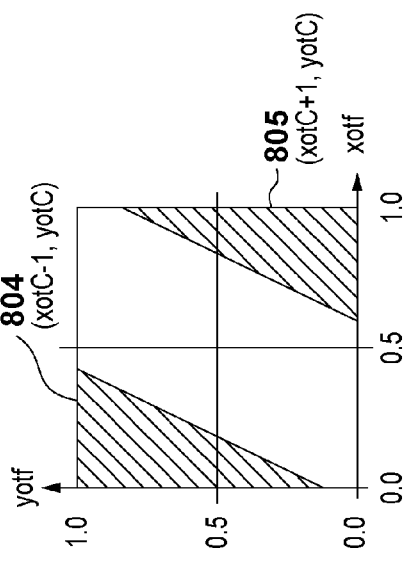

Referring to each of the graphs of FIGS. 8A to 8D, the abscissa axis represents xotf; and the ordinate axis, yotf. Referring to FIG. 8A, a region 801 is a region satisfying the following condition. Assume first that the pixel position obtained by performing inverse transformation of the above projection transformation for the pixel position (xotC−1, yotC−1) adjacent to the upper left of the pixel position (xotC, yotC) is represented by (p1, q1). In this case, the region 801 is the range of xotf and yotf, in which the integer part of p1 coincides with xi, and the integer part of q1 coincides with yi. On the other hand, when the position (xotf, yotf) represented by obtained xotf and yotf is located in the region 801, the integer parts of p1 and q1 obtained by performing inverse transformation of the above projection transformation for the pixel position (xotC−1, yotC−1) respectively coincide with xi and yi. This applies to other regions 800, 802 to 805, and 808. Note that these regions sometime overlap each other. For the sake of viewability, FIGS. 8A to 8D separately show four such cases. Referring to FIGS. 8A to 8D, the following seven coordinate values are possible coordinate values that the output pixel peripheral coordinate generation unit 203 may output as the output pixel peripheral coordinate values 223:

(xotC−1, yotC−1)
(xotC+0, yotC−1)
(xotC−1, yotC+0)
(xotC+0, yotC+0)
(xotC+1, yotC+0)
(xotC+0, yotC+1)
(xotC+1, yotC+1)

The determination condition generation unit 703 sends parameters defining the respective regions 800 to 805 and 808 as a determination condition 704 to the output pixel peripheral coordinate generation unit 203. For example, as shown in FIGS. 8A to 8D, the region 801 is enclosed by straight lines A806 and B807, the xotf-axis, and the yotf-axis. The straight lines A806 and B807 can be expressed as follows:

$y = A1 \cdot x + A2$ (straight line A)

$y = B1 \cdot x + B2$ (straight line B)

The determination condition generation unit 703 then generates parameters representing the following condition as parameters defining the region 801:

$$0.0 \leq xotf \leq 1.0$$

$$0.0 \leq yotf \leq 1.0$$

$$yotf \geq A1 \cdot xotf + A2 \text{(straight line } A\text{)}$$

$$yotf \geq B1 \cdot xotf + B2 \text{(straight line } B\text{)}$$

The determination condition generation unit 703 also generates such parameters defining the other regions 800, 802 to 805, and 808. The determination condition generation unit 703 then sends the parameters generated for the respective regions 800 to 805 and 808 as the determination condition 704 altogether to the output pixel peripheral coordinate generation unit 203.

A method of obtaining parameters for defining each region will be described below. Since each region depends on the deformation parameters 129, parameters for defining each region are generated by using the deformation parameters 129. More specifically, the determination condition generation unit 703 obtains the gradient and intercept coefficients of straight line functions enclosing a region corresponding to each adjacent pixel coordinate value.

Figure 9A:
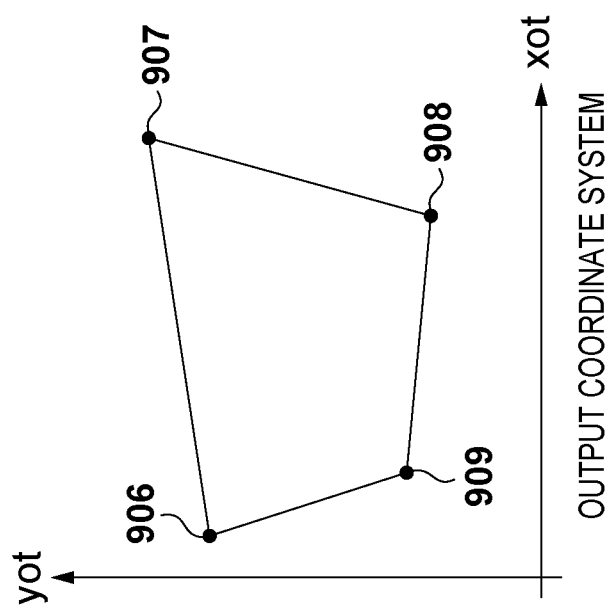
FIGS. 9A and 9B are graphs for explaining processing of obtaining a region.
Figure 9B:
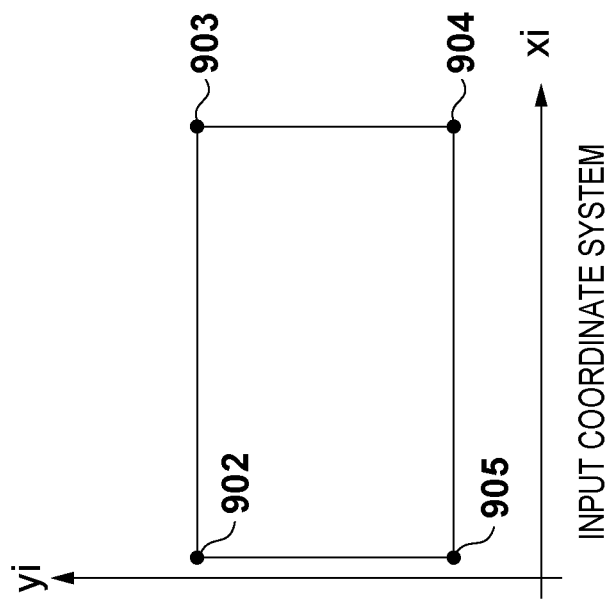

Assume that an output image (xot-yot plane) in FIG. 9B showing a deformed rectangle is obtained by performing image deformation processing for an input image (xi-yi plane) in FIG. 9A by using the deformation parameters 129. The rectangle in FIG. 9A is constituted by vertices (input end points) 902 to 905. The rectangle in FIG. 9B is constituted by vertices (output end points) 906 to 909.

Figure 10:
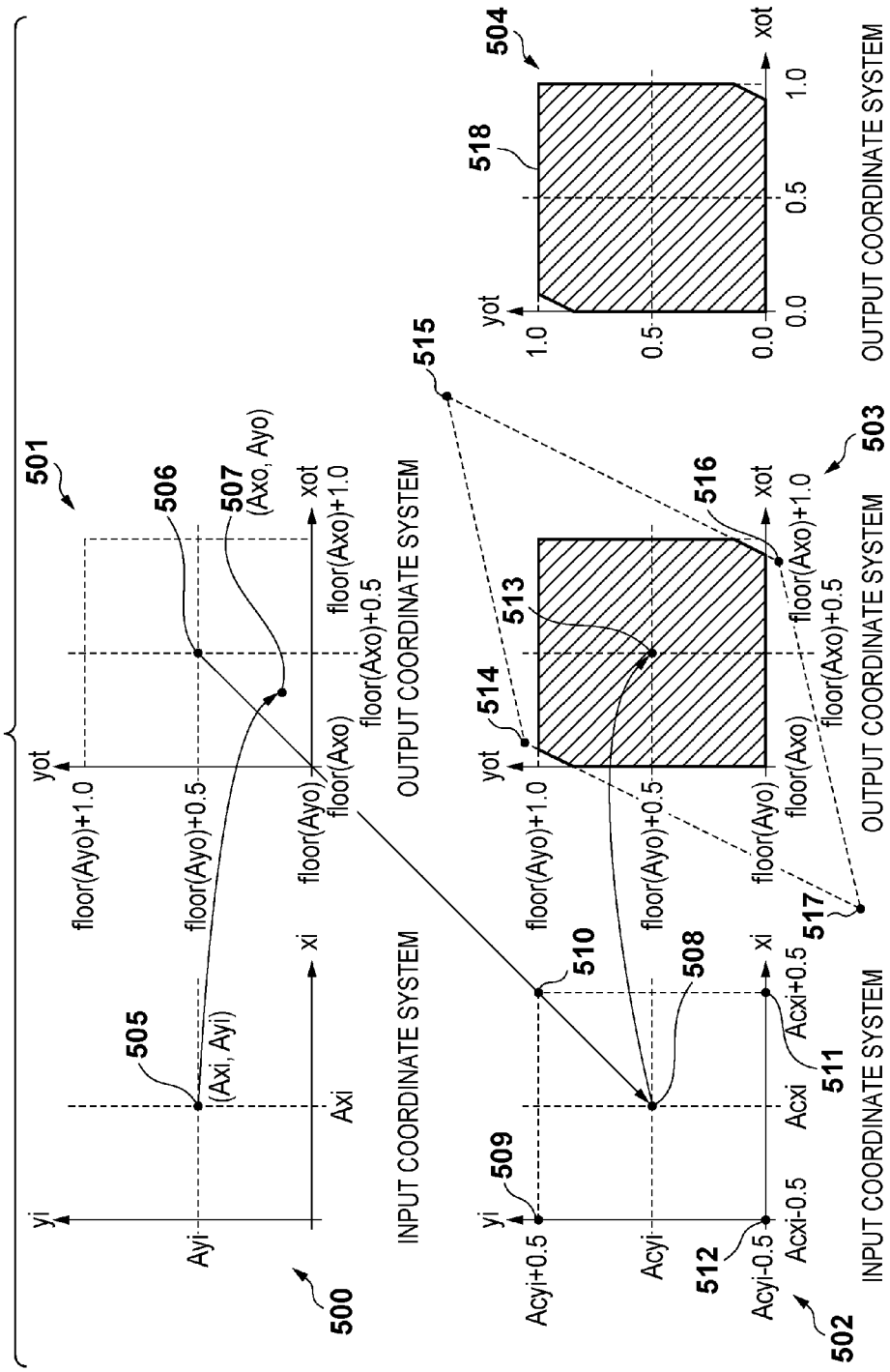
FIG. 10 is a graph for explaining the processing of obtaining a region.

A method of obtaining each region will be described with reference to FIG. 10. This apparatus selects one of the input end points 902 to 905 shown in FIG. 9A as an input end point 505, and obtains an end point after transformation of the input end point 505 by image deformation processing as an output end point 507. Letting (Axo, Ayo) be the pixel position of the output end point 507, an output center point 506 is set to a pixel position (floor(Axo)+0.5, floor(Ayo)+0.5).

The apparatus then obtains, as an input center point 508, a point after transformation of the output center point 506 by inverse transformation processing of image deformation processing. Letting (Acxi, Acyi) be the pixel position of the input center point 508, input neighboring points 509 to 512 are respectively set to the following four pixel positions:

(Acxi−0.5, Acyi+0.5)
(Acxi+0.5, Acyi+0.5)
(Acxi+0.5, Acyi+0.5)
(Acxi−0.5, Acyi−0.5)

The apparatus then obtains points after transformation of the input neighboring points 509 to 512 by image deformation processing as output neighboring points 514 to 517. Of the region enclosed by the output neighboring points 514 to 517, a region satisfying $0.0 \leq xot < 1.0$ and $0.0 \leq yot < 1.0$ is obtained as a determination region 518.

The above processing for obtaining the determination region 518 is performed for each of the input end points 902 to 905. Regions as a union of determination regions 518 obtained with respect to the respective regions are then output as regions corresponding to the pixel positions (xotC, yotC). When selecting the output center point 506 in an output coordinate system 501, the apparatus executes similar processing for eight adjacent pixel coordinates of ±1.0, thereby obtaining all regions.

Upon receiving the determination condition 704, the output pixel peripheral coordinate generation unit 203 refers to the respective parameters included in the determination condition 704. The output pixel peripheral coordinate generation unit 203 then determines whether the position (xotf, yotf) represented by xotf and yotf obtained by the above equations belongs to any of the regions 800 to 805 and 808. The output pixel peripheral coordinate generation unit 203 then outputs a pixel position (reference pixel position) corresponding to the region to which the position (xotf, yotf) represented by xotf and yotf obtained by the above equations is determined to belong.

If, for example, the position (xotf, yotf) represented by xotf and yotf obtained by the above equations is located in the region 801, the output pixel peripheral coordinate generation unit 203 outputs a pixel position (xotC−1, yotC−1) as a reference pixel position. In this manner, the output pixel peripheral coordinate generation unit 203 outputs a pixel position (reference pixel position) corresponding to the region to which the position (xotf, yotf) represented by xotf and yotf obtained by the above equations is determined to belong.

In this manner, this embodiment generates the determination condition 704 based on the deformation parameters 129, and selects the output pixel peripheral coordinate values 223 corresponding to the input pixel value 121 based on the determination condition 704. If the enlargement rate is less than 2, there are nine points as candidates of the output pixel peripheral coordinate values 223. As described above, using the determination condition 704 can reduce the number of output pixel peripheral coordinate values 223 to four or less. This makes it possible to reduce the number of times of inverse transformation by the coordinate inverse transformation unit 204. Since it is possible to reduce the number of times of necessary coordinate transformation as compared with the prior art, it is possible to reduce the circuit amount to an amount smaller than that in the conventional write time coordinate transformation scheme. In addition, it is possible to reduce the circuit amount at the time of hardware implementation while the peak value of a necessary memory band remains small or to perform projection transformation with high processing performance at the time of software implementation. Note that in the embodiment, even if the enlargement rate is set to an arbitrary magnification, it is possible to extend the technique by increasing the number of neighboring points.

In addition, of the units shown in FIGS. 1 to 3, 6, and 7, units other than the one functioning as a memory may be implemented by software (computer programs). In this case, a computer including this memory in which the software is installed functions as the above image processing apparatus by causing the CPU of the computer to execute the software. Obviously, all the constituent elements shown in FIGS. 1 to 3, 6, and 7 may be implemented by hardware or may be partially implemented by software.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-137737 filed Jun. 21, 2011 which is hereby incorporated by reference herein in its entirety.

What is claimed is:

1. An image processing apparatus which generates an output image by performing image deformation processing for an input image, comprising:
   a unit that obtains a pixel position (xo, yo) at which a pixel position (xi, yi) in the input image is mapped by performing the image deformation processing for the input image;
   an acquisition unit that acquires a plurality of reference pixel positions set in advance for a combination of at least one of (i) whether or not a fraction part of a value obtained by adding 0.5 to a fraction part of xo is not less than a specified value and (ii) whether or not a fraction part of a value obtained by adding 0.5 to a fraction part of yo is not less than a specified value;
   a unit that obtains a pixel position (xi', yi') by performing inverse mapping of the mapping for each of the plurality of reference pixel positions;
   a unit that obtains a pixel position (xi", yi") by performing the inverse mapping for a pixel position (xoc, yoc) represented by an integer part xoc of the xo and an integer part yoc of the yo;
   a specification unit that specifies a pixel position, of the pixel position (xi", yi") and the pixel position (xi', yi') obtained for each of the plurality of reference pixel positions, at which an integer part of an x-coordinate value and an integer part of a y-coordinate value respectively coincide with xi and yi; and
   a calculation unit that obtains a pixel value at a pixel position (xoc, yoc) on the output image by performing interpolation processing using a fraction part of the x-coordinate value and a fraction part of the y-coordinate value at the pixel position specified by said specification unit and pixel values of pixels at peripheral pixel positions of the pixel position (xi, yi) in the input image.

2. The apparatus according to claim 1, wherein said acquisition unit acquires, as the reference pixel positions, (xoc, yoc+1), (xoc−1, yoc), (xoc, yoc−1), and (xoc−1, yoc+1) if the fraction part xof of xo satisfies $0.0 \leq xof < 0.5$, and acquires, as the reference pixel positions, (xoc+1, yoc), (xoc, yoc+1), (xoc, yoc−1), and (xoc+1, yoc−1) if the fraction part xof of xo satisfies $0.5 \leq xof < 1.0$.

3. The apparatus according to claim 1, wherein said acquisition unit acquires, as the reference pixel positions, (xoc−1, yoc), (xoc, yoc−1), and (xoc−1, yoc−1) if a fraction part xof of xo satisfies $0.0 \leq xof < 0.5$ and a fraction part yof of yo satisfies $0.0 \leq yof < 0.5$,
   acquires, as the reference pixel positions, (xoc−1, yoc), (xoc, yoc+1), and (xoc−1, yoc+1) if the fraction part xof of xo satisfies $0.0 \leq xof < 0.5$ and the fraction part yof of yo satisfies $0.5 \leq yof < 1.0$,
   acquires, as the reference pixel positions, (xoc+1, yoc), (xoc, yoc−1), and (xoc+1, yoc−1) if the fraction part xof of xo satisfies $0.5 \leq xof < 1.0$ and the fraction part yof of yo satisfies $0.0 \leq yof < 0.5$, and
   acquires, as the reference pixel positions, (xoc, yoc+1), (xoc+1, yoc), and (xoc+1, yoc+1) if the fraction part xof of xo satisfies $0.5 \leq xof < 1.0$ and the fraction part yof of yo satisfies $0.5 \leq yof < 1.0$.

4. An image processing method performed by an image processing apparatus which generates an output image by performing image deformation processing for an input image, comprising:
   a step of obtaining a pixel position (xo, yo) at which a pixel position (xi, yi) in the input image is mapped by performing the image deformation processing for the input image;
   an acquisition step of acquiring a plurality of reference pixel positions set in advance for a combination of at least one of (i) whether or not a fraction part of a value obtained by adding 0.5 to a fraction part of xo is not less than a specified value and (ii) whether or not a fraction part of a value obtained by adding 0.5 to a fraction part of yo is not less than a specified value;
   a step of obtaining a pixel position (xi', yi') by performing inverse mapping of the mapping for each of the plurality of reference pixel positions;
   a step of obtaining a pixel position (xi", yi") by performing the inverse mapping for a pixel position (xoc, yoc) represented by an integer part xoc of the xo and an integer part yoc of the yo;
   a specification step of specifying a pixel position, of the pixel position (xi", yi") and the pixel position (xi', yi') obtained for each of the plurality of reference pixel positions, at which an integer part of an x-coordinate value and an integer part of a y-coordinate value respectively coincide with xi and yi; and
   a calculation step of obtaining a pixel value at a pixel position (xoc, yoc) on the output image by performing interpolation processing using a fraction part of the x-coordinate value and a fraction part of the y-coordinate value at the pixel position specified in the specification step and pixel values of pixels at peripheral pixel positions of the pixel position (xi, yi) in the input image.

5. A non-transitory computer-readable storage medium storing a computer program for causing a computer to function as each unit of an image processing apparatus defined in claim 1.

* * * * *